(12) United States Patent
Kubota et al.

(10) Patent No.: US 7,747,587 B2
(45) Date of Patent: Jun. 29, 2010

(54) METHOD AND APPARATUS FOR SUPPORTING LOG ANALYSIS

(75) Inventors: Kazumi Kubota, Kawasaki (JP); Riichiro Take, Kawasaki (JP); Naoki Akaboshi, Kawasaki (JP); Lilian Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 683 days.

(21) Appl. No.: 11/146,322

(22) Filed: Jun. 7, 2005

(65) Prior Publication Data

US 2006/0195297 A1    Aug. 31, 2006

(30) Foreign Application Priority Data

Feb. 28, 2005 (JP) .............................. 2005-053999

(51) Int. Cl.
  G06F 7/00 (2006.01)
  G05D 1/00 (2006.01)
  G06N 5/02 (2006.01)
(52) U.S. Cl. ............................. 707/694; 701/45; 706/47
(58) Field of Classification Search .................... 707/6
   See application file for complete search history.

(56) References Cited

U.S. PATENT DOCUMENTS

| | | | |
|---|---|---|---|
| 5,740,355 A * | 4/1998 | Watanabe et al. ............. 714/45 |
| 6,647,400 B1 * | 11/2003 | Moran ......................... 707/205 |
| 6,917,972 B1 * | 7/2005 | Basko et al. ................. 709/224 |
| 7,107,338 B1 * | 9/2006 | Nareddy et al. ............. 709/224 |
| 2002/0104083 A1 * | 8/2002 | Hendricks et al. ............ 725/34 |
| 2003/0009705 A1 * | 1/2003 | Thelander et al. ........... 713/340 |
| 2003/0034995 A1 * | 2/2003 | Osborn et al. ............... 345/713 |
| 2003/0058280 A1 * | 3/2003 | Molinari et al. ............. 345/771 |
| 2003/0093471 A1 * | 5/2003 | Upton ......................... 709/203 |
| 2003/0226038 A1 * | 12/2003 | Raanan et al. ............... 713/201 |
| 2004/0068562 A1 * | 4/2004 | Tilton et al. .................. 709/225 |
| 2004/0117358 A1 * | 6/2004 | von Kaenel et al. ............ 707/3 |
| 2004/0186829 A1 * | 9/2004 | Suzuki et al. ................... 707/3 |
| 2005/0015207 A1 * | 1/2005 | Prasad .......................... 702/19 |
| 2005/0076052 A1 * | 4/2005 | Kojima ........................ 707/102 |
| 2005/0114508 A1 * | 5/2005 | DeStefano ................... 709/224 |
| 2006/0074836 A1 * | 4/2006 | Gardner et al. ................ 706/60 |
| 2007/0061450 A1 * | 3/2007 | Burnley et al. .............. 709/224 |

(Continued)

FOREIGN PATENT DOCUMENTS

JP    4-297229    10/1992

OTHER PUBLICATIONS

Hisayoshi Kato, Hironori Hiraoshi and Fumio Mozoguchi, "Log summarizing agent for web access data using data mining techniques", 2001, 1-6.*

*Primary Examiner*—Neveen Abel Jalil
*Assistant Examiner*—Tarek Chbouki
(74) *Attorney, Agent, or Firm*—Staas & Halsey LLP

(57) ABSTRACT

An apparatus for classifying a plurality of logs recorded in a log file includes: a parsing unit that performs a parsing of the logs in the log file; a rule generating unit that generates a rule for a data classification based on a result of the parsing; a data classifying unit that performs the data classification, based on the rule generated, to classify the logs into a plurality of groups; a display unit that displays a result of the data classification; and a rule editing that edits the rules based on an instruction from a user.

15 Claims, 13 Drawing Sheets

U.S. PATENT DOCUMENTS

2007/0150470 A1* 6/2007 Brave et al. .................... 707/6
2007/0208992 A1* 9/2007 Koren ....................... 715/503
2008/0148239 A1* 6/2008 Petrov et al. ................ 717/128

* cited by examiner

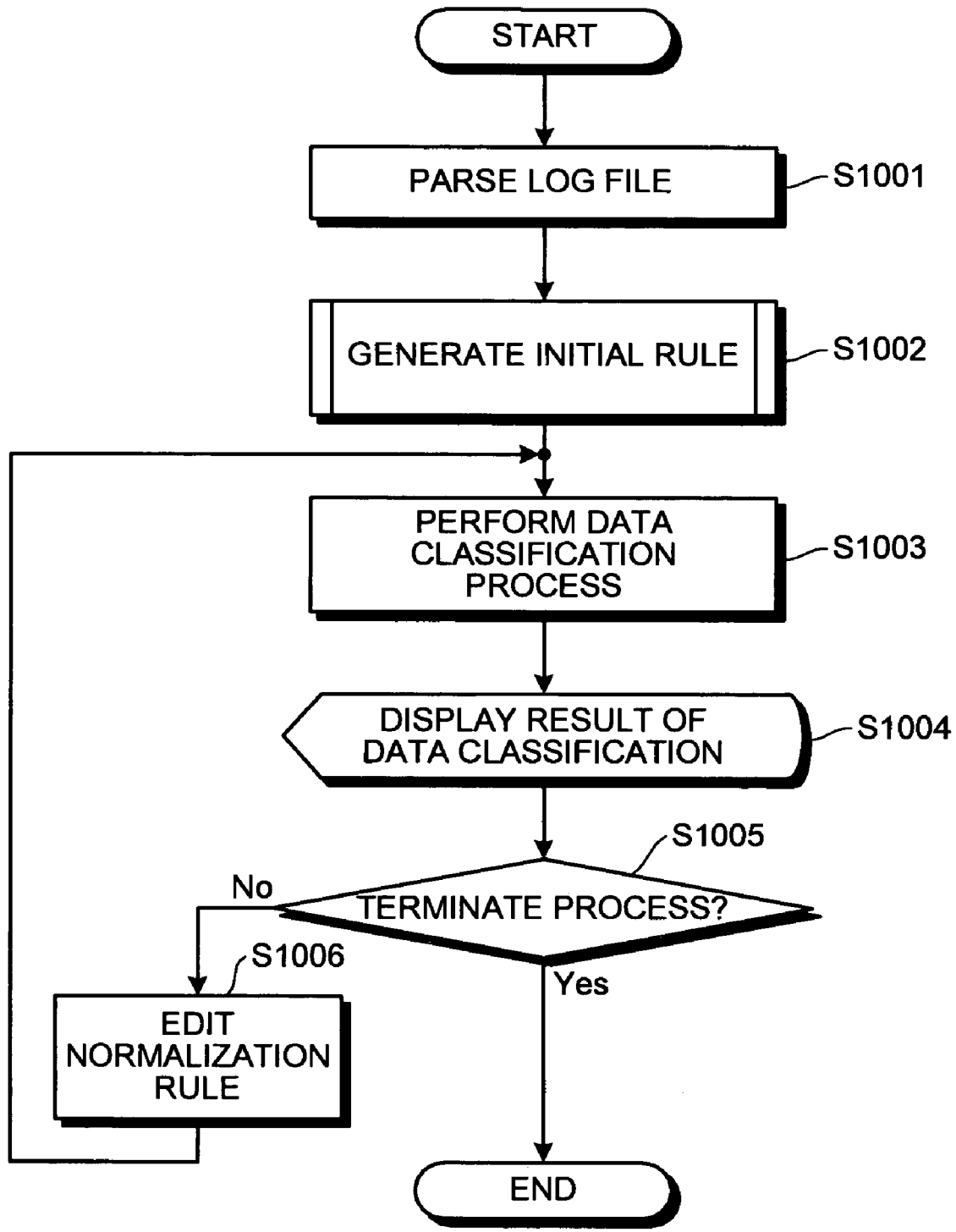

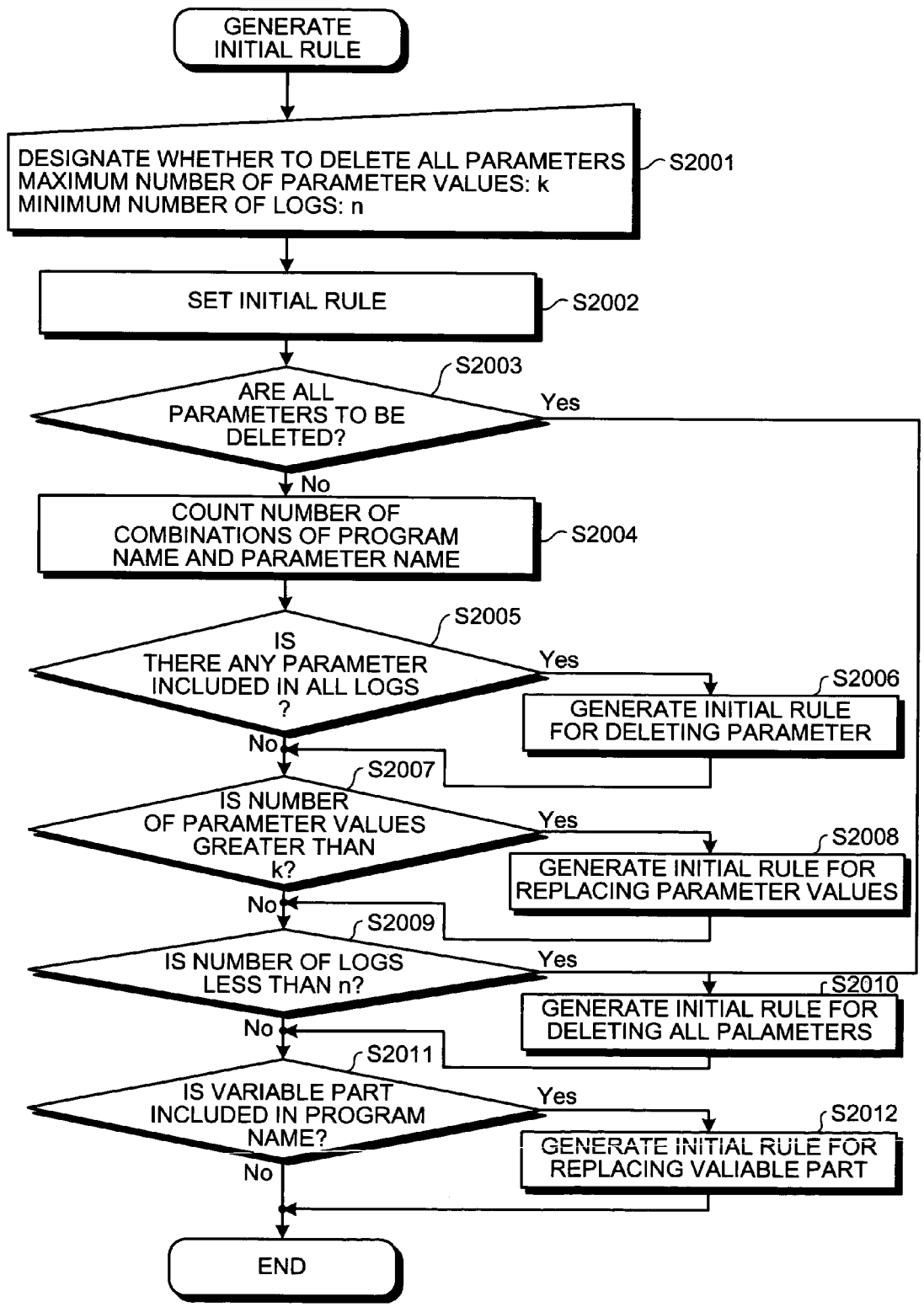

FIG.4

| LOG ID | PROGRAM NAME | PARAMETER NAME | PARAMETER VALUE |
|---|---|---|---|
| 1 | http://hostname/dynamic.asp | PARAM1<br>PARAM2<br>PARAM3<br>PARAM4 | V1<br>V2<br>V3<br>V4 |
| 2 | http://hostname/dynamic.asp | PARAM1<br>PARAM3<br>PARAM4 | V1<br>V3<br>V4 |
| 3 | http://hostname/dynamic.asp | PARAM1<br>PARAM3<br>PARAM5 | V1<br>V3<br>V5 |
| 4 | http://hostname/program.asp | PARAM2<br>PARAM4 | V2<br>V4 |

FIG.5

| LOG ID | PROGRAM NAME | PARAMETER NAME | PARAMETER VALUE |
|---|---|---|---|
| 1 | http://hostname/dynamic.asp | SESSION_NO<br>UID<br>PARAM3 | 001<br>aaaaa<br>V3 |
| 2 | http://hostname/dynamic.asp | SESSION_NO<br>UID<br>PARAM4 | 002<br>bbbbb<br>V4 |
| 3 | http://hostname/dynamic.asp | SESSION_NO<br>UID<br>PARAM5 | 003<br>ccccc<br>V5 |

FIG.10
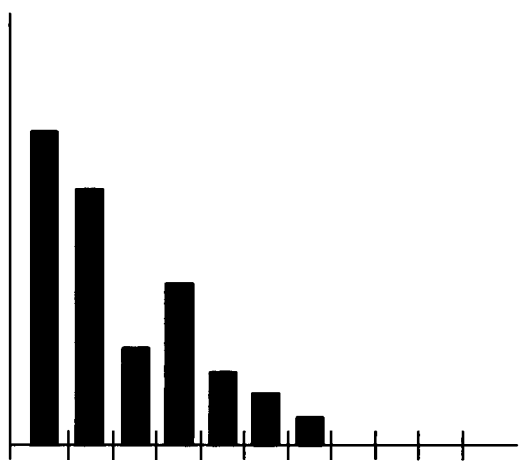
HISTOGRAM A
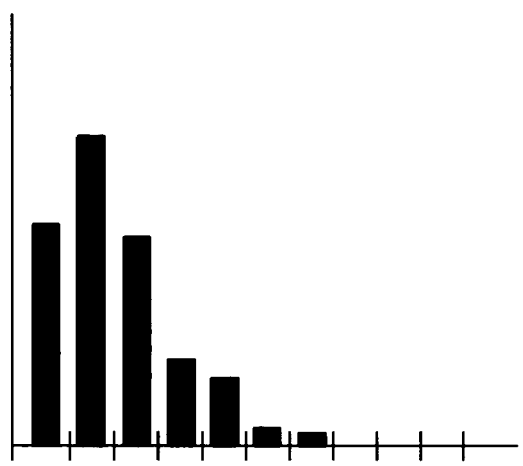
HISTOGRAM B
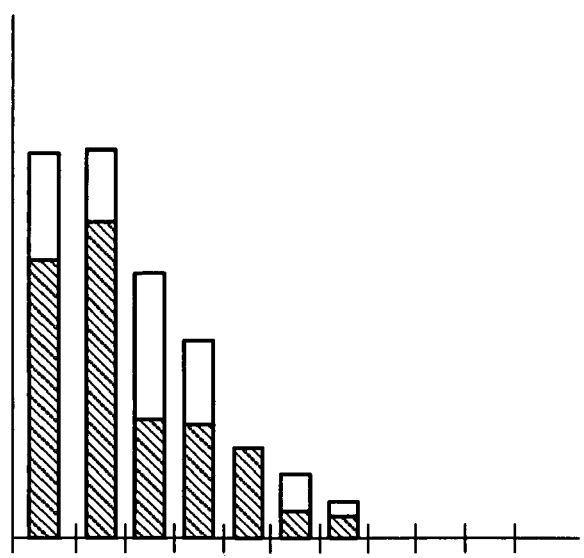
OVERLAP AREA OF
HISTOGRAMS A AND B

FIG.12

```
%rule↓
    ='aaaaaa[aaa/aaaa]' > 'aaaaaa ¥ '
    ='addddd[bb/aa-aa]'=> 'addddd= ¥ '
    ='bbbbbb/a/n' > 'bbbbbb/a/n'
           .
           .
           .
           .
           .
           .
           .
``` filter_******.pl

FIG.13

```
require 'filter_******.pl';

13rule_list=keys[%rule];
13dir_rule_list=keys[%dir_rule];
           .
           .
           .
           .
           .
           .
```

METHOD AND APPARATUS FOR SUPPORTING LOG ANALYSIS

BACKGROUND OF THE INVENTION

1) Field of the Invention

The present invention relates to a technology for classifying a plurality of uniform resource identifiers (URLs), which are substantially the same but are slightly different, into a plurality of groups to perform a log analysis on an IP network including a plurality of servers, such as a Web server, an application server, and a database server.

2) Description of the Related Art

In a system including a plurality of servers, such as a Web server, an application server, and a database server, each server operates in conjunction with other servers. For example, the Web server receives a hyper text transfer protocol (HTTP) request from a user and sends it to the application server; the application server receives the page request and sends a structured query language (SQL) query to the database server; and the database server receives the SQL query and searches a database therein. Conventionally, however, it has been difficult to determine, for example, the cause of a fault occurred in the system or a bottleneck in the system, since the conventional technology only monitors performance of each server (for example, the utilization thereof and the cache-hit ratio thereof) respectively.

For the determination, it is necessary to perform a so-called "data classification process". A typical example of the data classification is a process of picking out the same person's records redundantly registered in a customer database of a company.

For example, when a plurality of records of a customer A is found in the customer database by comparing each customer's attribute (such as name, telephone number, and address), all records of the customer A is integrated in one record.

In such cases, however, character string comparison sometimes cannot determine whether the records are the same customer's records. For example, the telephone numbers in the records can be different since the customer A changed the telephone number. Similarly, the addresses in the records can be different since the addresses in some records are abbreviated. The data classification process is required for such cases, which includes conversion into regular expression, deletion of unnecessary parameters, and grouping of character strings that are substantially the same.

According to the present invention, however, a data classification for a log analysis of a system including a Web server is taken as an example. The analysis is performed for evaluating performance of the system by calculating an average of response time of the Web server for each Web page, based on a log of the Web server in which the URL and the time of each access are recorded.

The data classification is performed on the URLs, which have different structures, properties, or objects to each other. The URLs includes not only a static URL corresponding to an existing Web page, but also a dynamic URL corresponding to a Web page to be created by an application program. The dynamic URL includes a filename and parameters of the application program. Examples of the URL are:

(0) http://hostname/static.html;
(1) http://hostname/dynamic.asp?PARAM1=v1&PARAM2=v2&PARAM3=v3&PARAM4=v4;
(2) http://hostname/dynamic.asp?PARAM1=v1&PARAM3=v3&PARAM4=v4;
(3) http://hostname/dynamic.asp?PARAM1=vx&PARAM3=v3&PARAM5=v5; and
(4) http://hostname/program.asp?PARAM2=v2&PARAM4=v4.

The example (0) is an example of the static URL, which identifies a file "static.html" on a Web server "hostname". The examples (1) to (4) are an example of the dynamic URL, which respectively includes the filename (such as "http://hostname/dynamic.asp" and "http://hostname/program.asp") and a list of parameters following "?". Each parameter includes the parameter name and the value thereof, which are separated by "&". The URL in the example (1) includes parameters PARAM1, PARAM2, PARAM3, and PARAM4 and values v1, v2, v3, and v4 respectively.

When an operations manager tries to determine whether the Web server is operating normally, the sum of processing times of all accesses is divided by the number of the accesses for calculating an average time that is required for the Web server to send the Web page to a client after receiving a request.

However, what the operations manager wants to know actually can be an average processing time for each program or for each pattern of parameters for the program. When the operations manager focuses on the average processing time of each program, it can be calculated by neglecting all the parameters included in the URL. However, in some cases, the processing executed by a program can be largely different according to whether a specific parameter/value or a specific combination of parameters/values is included in the URL. Therefore, if the average processing time of each program is calculated as described above, the operations manager can overlook a potential failure that can occur when a specific parameter/value or a specific combination of parameters/values is included in the URL, in spite of the fact that the analysis is performed to identify the potential failure and the components of the system impacted by the failure.

In such cases, therefore, the average processing time needs to be calculated for each parameter/value included in the URL. However, if the URL is treated just as a character string, there are going to be too many types of URLs in which only the parameters are slightly different. For example, the URLs in the examples (1), (2), and (3) respectively include different parameters and values thereof, even though including the same filename of the program "http://hostname/dynamic.asp".

In such cases, the URLs of the examples (0) to (4) need to be converted into regular expression, for example:
(0') http://hostname/static.html;
(1') http://hostname/dynamic.asp;
(2') http://hostname/dynamic.asp;
(3') http://hostname/dynamic.asp; and
(4') http://hostname/dynamic.asp, or when the operations operator focuses on the PARAM2, for example:
(0") http://hostname/static.html;
(1") http://hostname/dynamic.asp?PARAM2=v2;
(2") http://hostname/dynamic.asp;
(3") http://hostname/dynamic.asp; and
(4") http://hostname/dynamic.asp?PARAM2=v2.

However, in many cases, even the operations manager cannot determine what rules are required for the data classification to perform the analysis at the time of preparation.

For example, in many cases, which parameter influences a processing time of a program is known only to a designer of the program or is described only in design specification. Generally, the designer is not the operations manager. Moreover, the actual program can be modified from that described in the design specification.

Conventionally, the analysis and the preparation thereof, such as the data classification, were performed on a trial and error basis. Moreover, the preparation had to be programmed for each analysis (for example, see Japanese Patent Application Laid-open Publication No. H4-297229).

However, it is not realistic to perform the data classification manually in a large scale system. Even if the preparation (including the data classification) is performed automatically by a program, it can take a lot of time to create the program for each analysis.

SUMMARY OF THE INVENTION

It is an object of the present invention to at least solve the problems in the conventional technology.

An apparatus according to an aspect of the present invention, which is for classifying a plurality of logs recorded in a log file, includes: a parsing unit that performs a parsing of the logs in the log file; a rule generating unit that generates a rule for a data classification based on a result of the parsing; a data classifying unit that performs the data classification, based on the rule generated, to classify the logs into a plurality of groups; a display unit that displays a result of the data classification; and a rule editing that edits the rules based on an instruction from a user.

A method according to another aspect of the present invention, which is for classifying a plurality of logs recorded in a log file, includes: performing a parsing of the logs in the log file; generating a rule for a data classification based on a result of the parsing; performing the data classification, based on the rule generated, to classify the logs into a plurality of groups; displaying a result of the data classification; and editing the rule based on an instruction from a user.

A computer-readable recording medium according to still another aspect of the present invention stores a computer program that causes a computer to execute the above method.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a flowchart of a process performed by the log-analysis-supporting system;

FIG. 3 is a flowchart of an initial rule generation process performed by the log-analysis-supporting system;

FIG. 4 is a table of results of a log parsing process performed by the log-analysis-supporting system;

FIG. 5 is another table of results of the log parsing process performed by the log-analysis-supporting system;

FIG. 10 is examples of a histogram according to the present embodiment;

FIG. 12 is an example of a normalization filter definition according to the present embodiment;

FIG. 13 is an example of an external program that calls the normalization filter definition;

DETAILED DESCRIPTION

Exemplary embodiments of the present invention are described below with reference to the accompanying drawings.

Figure 1:
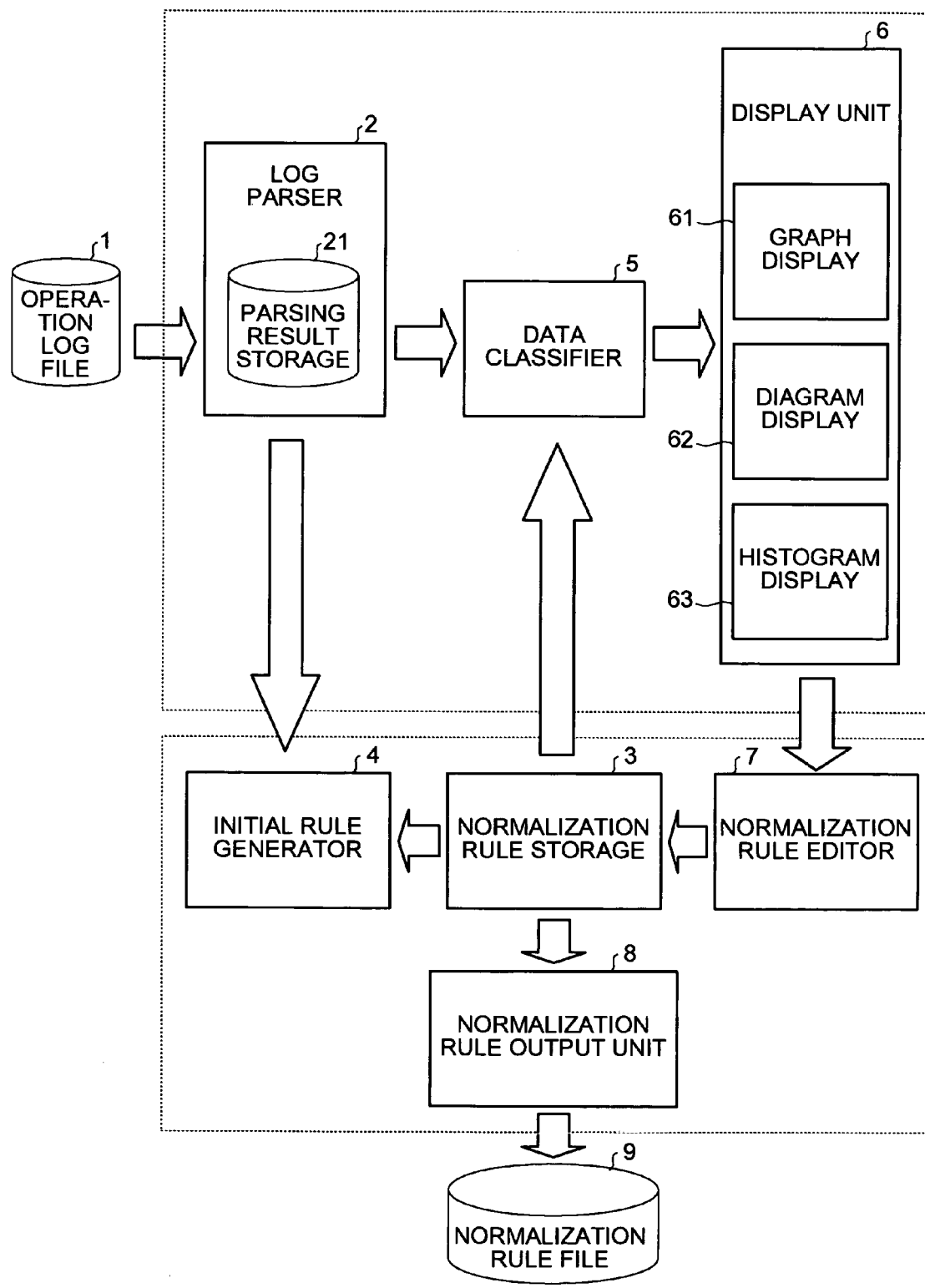
FIG. 1 is a diagram of a log-analysis-supporting system according to an embodiment of the present invention.

FIG. 1 is a diagram of a log-analysis-supporting system according to an embodiment of the present invention. An operation log file 1 stores operation logs of the system. A log parser 2 parses the operation log file 1 and stores parsing result in a parsing result storage 21. A normalization rule storage 3 stores various normalization rules for data classification. An initial rule generator 4 generates an initial normalization rule automatically based on the parsing result stored in the parsing result storage 21, and stores the initial rules in the normalization rule storage 3. A data classifier 5 performs a data classification process on the parsing result stored in the parsing result storage 21, based on the normalization rules stored in the normalization rule storage 3. A display unit 6 displays the result of the data classification process performed by the data classifier 5. The display unit 6 includes three display units, namely an graph display unit 61, a diagram display unit 62, and a histogram display unit 63.

A normalization rule editor 7 edits the normalization rules stored in the normalization rule storage 3, based on the instructions input by a system manager (the system also includes an input unit (not shown), such as a keyboard and a mouse, for receiving various instructions from the system manager). A normalization rule output unit 8 outputs the normalization rules stored in the normalization rule storage 3, which have been edited by the normalization rule editor 7, to a normalization rule file 9.

FIG. 2 is a flowchart of a process performed by the log-analysis-supporting system. When the operation log file 1 is input to the log parser 2, the log parser 2 parses the operation log file 1 to extract a parameter part included therein (step S1001). The operation log file 1 includes a pair of a timestamp and a URL, and the URL includes the parameter part that is formed of a filename of a program to be executed (a program name) and a name and value of a parameter of the program. For example, when parsing "http://hostname/dynamic.asp?PARAM=v1&PARAM2=v2&PARAM3=v3&PARAM4=v4", the log parser 2 extracts a character string before a delimiter "?", which includes a predetermined identifier such as "asp", as the program name. The log parser 2 also extracts a parameter name and a parameter value from a character string after the delimiter "?". The parameter name and the parameter value are separated by a delimiter "=", and pairs of the parameter name and the parameter value are separated by a delimiter "&".

Therefore, from the above URL, the log parser 2 extracts:
program name: http://hostname/dynamic.asp;
parameter name: PARAM1/parameter value: v1;
parameter name: PARAM2/parameter value: v2;
parameter name: PARAM3/parameter value: v3; and
parameter name: PARAM4/parameter value: v4, and stores extracted data (the parsing result) in the parsing result storage 21.

Next, the initial rule generator 4 generates initial rules automatically based on the parsing result stored in the parsing result storage 21 by the log parser 2 (step S1002).

FIG. 3 is a flowchart of an initial rule generation process performed by the initial rule generator 4. The system manager designates whether all the parameters are to be deleted or not, the maximum number of parameters k, and the minimum number of logs n (step S2001), which are stored in the normalization rule storage 3 as an initial rule by the initial rule generator 4 (step S2002).

Next, when the system manager has not designated to delete all the parameters (step S2003: No), the initial rule generator 4 counts the number of combinations of the program name and the parameter name, which are included in the operation log file 1 (step S2004).

Then, the initial rule generator 4 determines whether there is any parameter included in all the logs including a specific program name (step S2005). It is assumed that such a parameter does not impact the performance of the program. Therefore, if there is such a parameter (step S2005: Yes), the initial rule generator 4 generates an initial rule for deleting the name and the value of the parameter, and stores it in the normalization rule storage 3 (step S2006).

When a parsing result shown in FIG. 4 is stored in the parsing result storage 21, since "PARAM3=v3" is included in all the URLs including "dynamic.asp", the initial rule generator 4 generates a rule for deleting the parameter, which is written in a regular expression, such as
program name: "http://hostname/dynamic.asp"
parameter: "PARAM3=.*"=>" ".

By the above rule, a character string that matches the left side of "=>" and is included in a URL including the program name "http://hostname/dynamic.asp" is replaced by the right side of "=>".

Since the program name is only subjected to matching and not to be replaced, "=>" and the right side are omitted for the program name.

In the regular expression according to the present embodiment, "." matches with all the characters and "*" means a repetition of any character for more than zero times. Therefore, ". *" matches with any character string. The regular expression has been defined in many computer languages and tools as a notation for a rule of text matching or text replacement. An example of the regular expression is disclosed in "Mastering Regular Expressions, 2nd Edition" by Jeffrey E F. Friendl, http://www.oreilly.co.jp/books/4873111307/.

A parameter that indicates an identifier of each process in a series of processes or an object of each process (such as a user ID) can take a wide variety of values. In many cases, such identifiers do not impact the performance of the program. Therefore, the initial rule generator 4 counts the number of parameter values for each parameter name, and when the number is greater than the maximum number designated at step S2001 (step S2007: Yes), creates an initial rule for replacing the value of the parameter by a predetermined value, and stores it in the normalization rule storage 3 (step S2008).

When a parsing result shown in FIG. 5 is stored in the parsing result storage 21, the number of parameter values counted for the parameter named "SESSION_NO" becomes 3. When the number is greater than k (step S2007: Yes), the initial rule generator 4 generates a rule for replacing all the parameter values of "SESSION_NO" to a predetermined character string "val" (step S2008), such as program name: "http://hostname/dynamic.asp" parameter: "SESSION_NO=.*"=>"SESSION_NO=val".

Further, when the system manager has designated to delete all the parameters (step S2003: Yes) or when the number of logs included in the operation log file 1 is less than n designated at step S2001 (step S2009: Yes), the initial rule generator 4 generates a rule for deleting all the parameter names and the parameter values (step S2010), such as
program name: "http://hostname/dynamic.asp"
parameter: ".*"=>" ".

This is because, when the operation log file 1 includes only a few logs in view of the number of parameters, the data classification does not have remarkable effect even if it is performed.

Then, the initial rule generator 4 determines whether a variable part is included in the program name (step S2011). If the variable part is included in the program name, the initial rule generator 4 generates a rule for replacing the variable with a predetermined character string and stores it in the normalization rule storage 3 (step S2012).

Some program names include a variable as a part of the program name. For example, let us assume that the following URLs are input to the log parser 2:
(1) http://hostname/aaaaa/dynamic.asp?SESSION_NO=001&PARAM3=v3;
(2) http://hostname/bbbbb/dynamic.asp?SESSION_NO=002&PARAM=v4; and
(3) http://hostname/ccccc/dynamic.asp?SESSION_NO=003&PARAM5=v5.

The above URLs respectively include different program names. However, the variables included in the program names (such as "aaaaa" "bbbbb" and "ccccc") indicates user ID, and all of the URLs identifies the same program "dynamic.asp".

The initial rule generator 4 extracts each character string between "/" in the program names stored in the parsing result storage 21, and when the number of program names including the same character string is greater than a predetermined number, generates a rule for replacing different character strings included in the program names, by a predetermined character string, such as program name: "http://hostname/[A-Z, a-z]+/dynamic.asp"=>"http://hostname/val/dynamic.asp". In this example, [A-Z, a-z] indicate all alphabets including capital letters and small letters.

Return to FIG. 1, after the generation of initial rule, the data classifier 5 performs a data classification process according to the normalization rules stored in the normalization rule storage 3 (step S1003).

After the data classification process, the display unit 6 displays a result of the data classification process performed by the data classifier 5 (step S1004).

The result can be displayed in a form of a graph, a diagram, and a histogram. The graph display unit 61, the diagram display unit 62, and the histogram display unit 63 perform the respective display processes.

Figure 6:
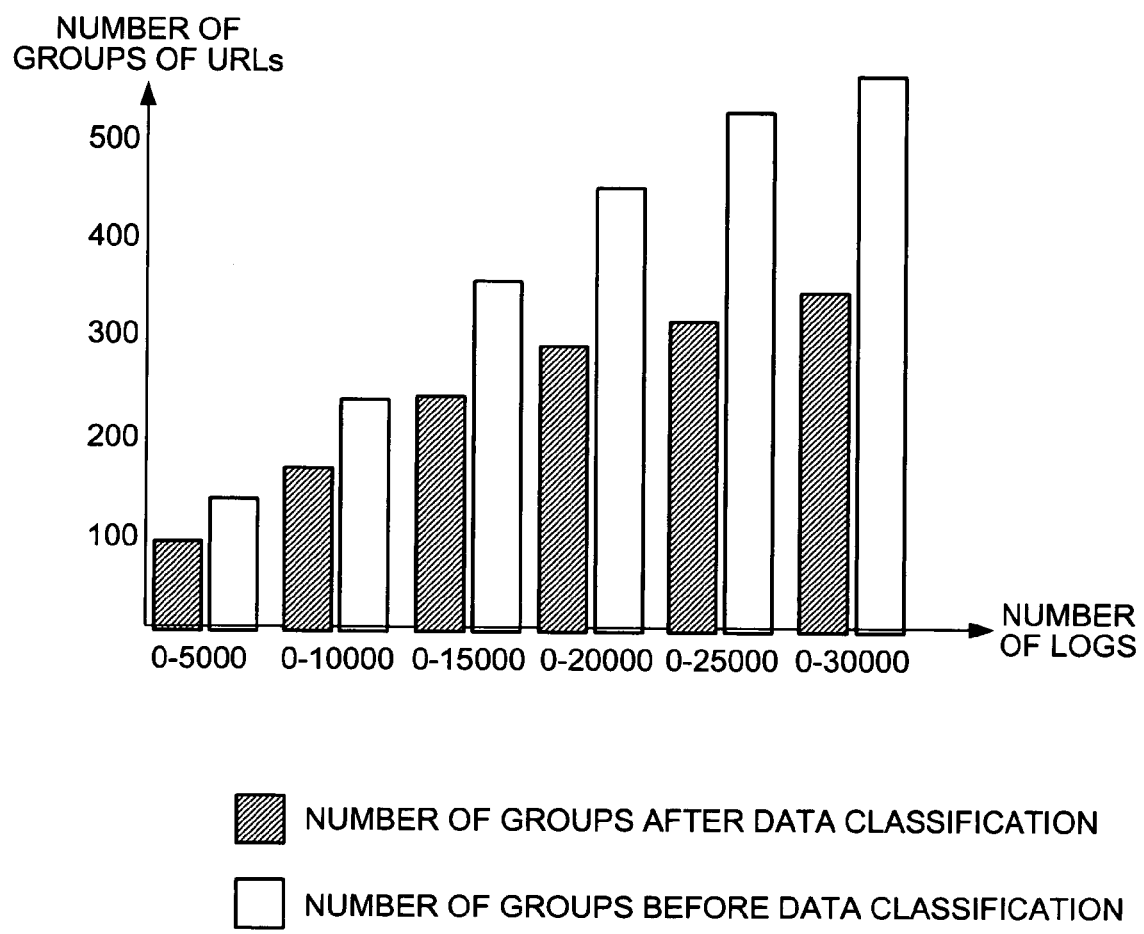
FIG. 6 is an example of a graph according to the present embodiment.

The graph display unit 61 displays a bar graph shown in FIG. 6 when the graph is selected by the system manager. The vertical axis indicates the number of groups of URLs. The horizontal axis indicates the number of lines in the operation log file 1 (in other words, the number of logs). In the bar graph, the numbers of the groups of URLs before and after the data classification are shown in contrast for the number of the logs.

If the normalization rules match the majority of patterns included in the operation log file 1, the number of groups after the data classification converges gradually to a constant value as the number of the logs increases, since a new log will be classified into any one of the existing groups without increasing the number of the groups.

Figure 7:
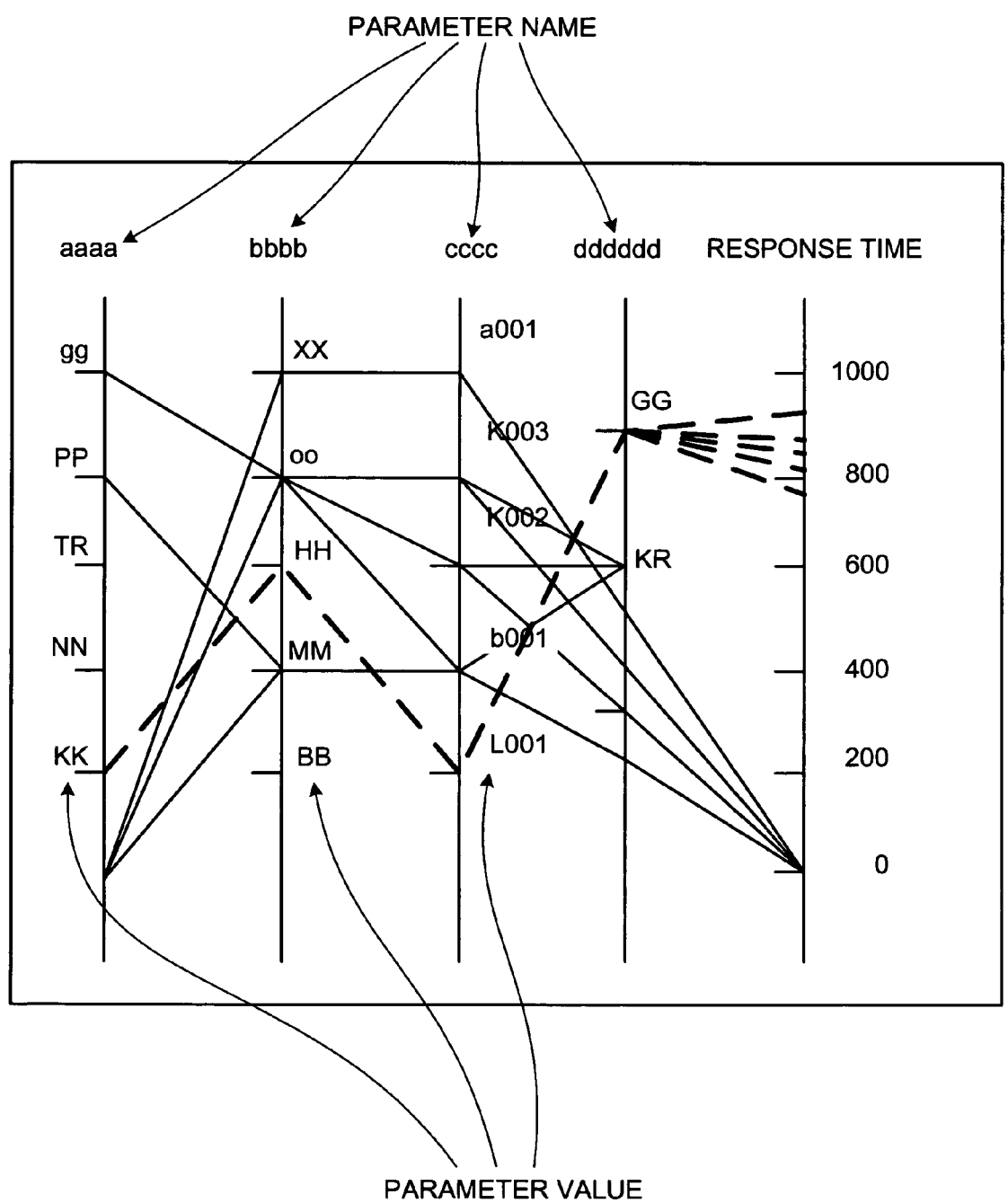
FIG. 7 is an example of a diagram according to the present embodiment.

The diagram display unit 62 displays a diagram shown in FIG. 7 when the diagram is selected by the system manager. The diagram indicates a relationship between a response time and a combination of the parameter name and the parameter value, thereby enabling the system manager to determine which combination impacts the response time.

Figure 8:
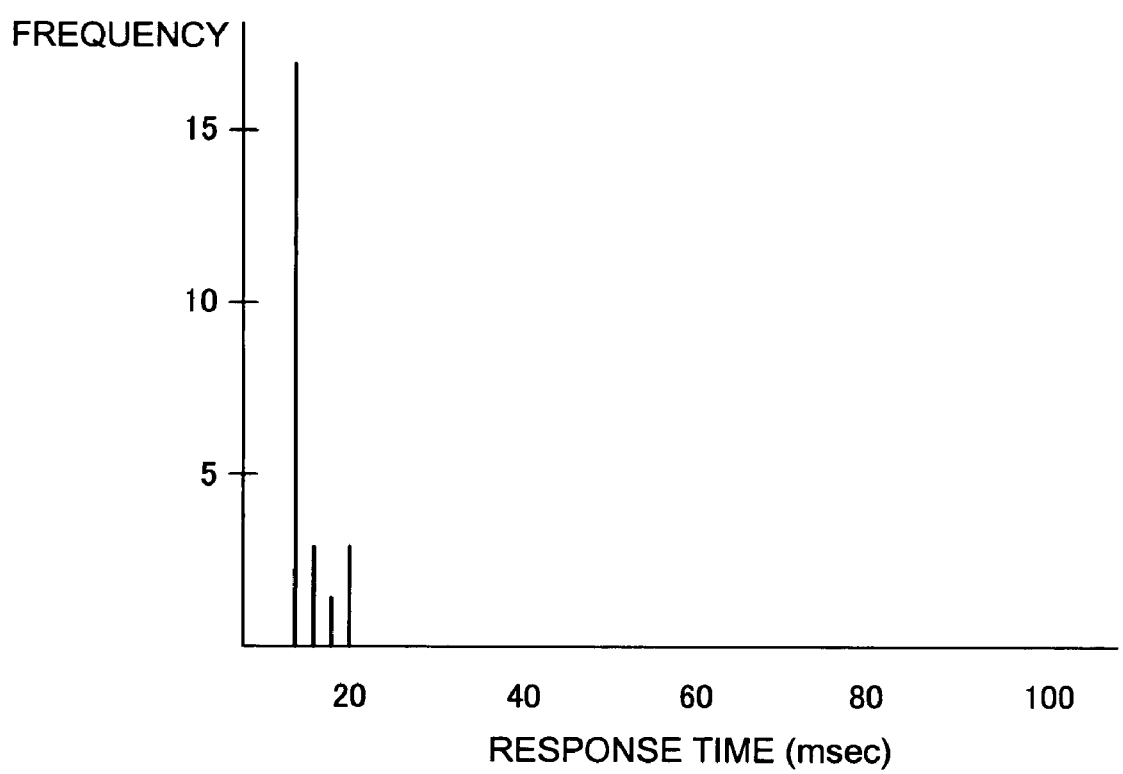
FIG. 8 is an example of a histogram according to the present embodiment.

The histogram display unit 63 displays a histogram shown in FIG. 8 when the histogram is selected by the system manager. The histogram is created for each process corresponding to each group. The horizontal axis indicates the response time, whereas the vertical axis indicates the frequency represented by a ratio of the number of logs to the total.

The system manager determines whether the data classification has been done appropriately by referring to the graph, the diagram, or the histogram. If the data classification process is satisfactory, the system manager instructs the system to terminate the process. Otherwise, the system manager instructs the system to start up the normalization rule editor 7 (step S1005) that performs a normalization rule editing process (step S1006) described below.

The system manager edits the normalization rule stored in the normalization rule storage 3 by repeating the following steps: checking the result of the data classification (concretely, the diagram displayed by the diagram display unit 62 or the histogram displayed by the histogram display unit 63); editing the normalization rule through the normalization rule editor 7; and checking the result of the data classification based on the edited normalization rule.

The operation log file 1 subjected to the data classification includes a large number of parameters. By referring to the diagram shown in FIG. 7, the system manager can determine which combination of the parameter name and the parameter value increases the response time. If such a parameter, which impacts the response time, is classified into a group with other parameters, the property thereof will be changed. Therefore, if there is a normalization rule for deleting such a parameter in the normalization rule storage 3, it is desirable to edit the rule not to delete such a parameter.

Conversely, if the response times are gathered at one point or spread over a wide area irrespective of the parameters, it is desirable to edit the normalization rule to delete the parameters that does not impact the response time.

For example, let us assume that the response time of a process corresponding to the following URL (3) is short, whereas those of the processes corresponding to (1), (2), and (4) are long:

(1) http://hostname/dynamic.asp?PARAM1=v1&PARAM2=v2&PARAM3=v3&PARAM4=v4;

(2) http://hostname/dynamic.asp?PARAM1=v1&PARAM3=v3&PARAM4=v4;

(3) http://hostname/dynamic.asp?PARAM1=v1&PARAM3=v3&PARAM5=v5; and (4) http://hostname/program.asp?PARAM1=v1&PARAM4=v4.

It is assumed that PARAM5, which is included only in (3), impacts the response time, whereas PARAM1, which is included in all of (1) to (4), does not impact the response time. It is not clear whether PARAM2, PARAM3, and PARAM4 impacts the response time. The system manager determines whether there is any parameter or any combination of parameters impacting the response time based on a result of clustering performed by the system, and edits the normalization rule to delete parameters that do not impact the response time.

For example, when PARAM2 and PARAM3 are turned out not to impact the response time, the following normalization rule such as is generated.

program name: "dynamic.asp"

parameter: "PARAM2=.*"=>" ", "PARAM3=.*"=>" "

Figure 9:
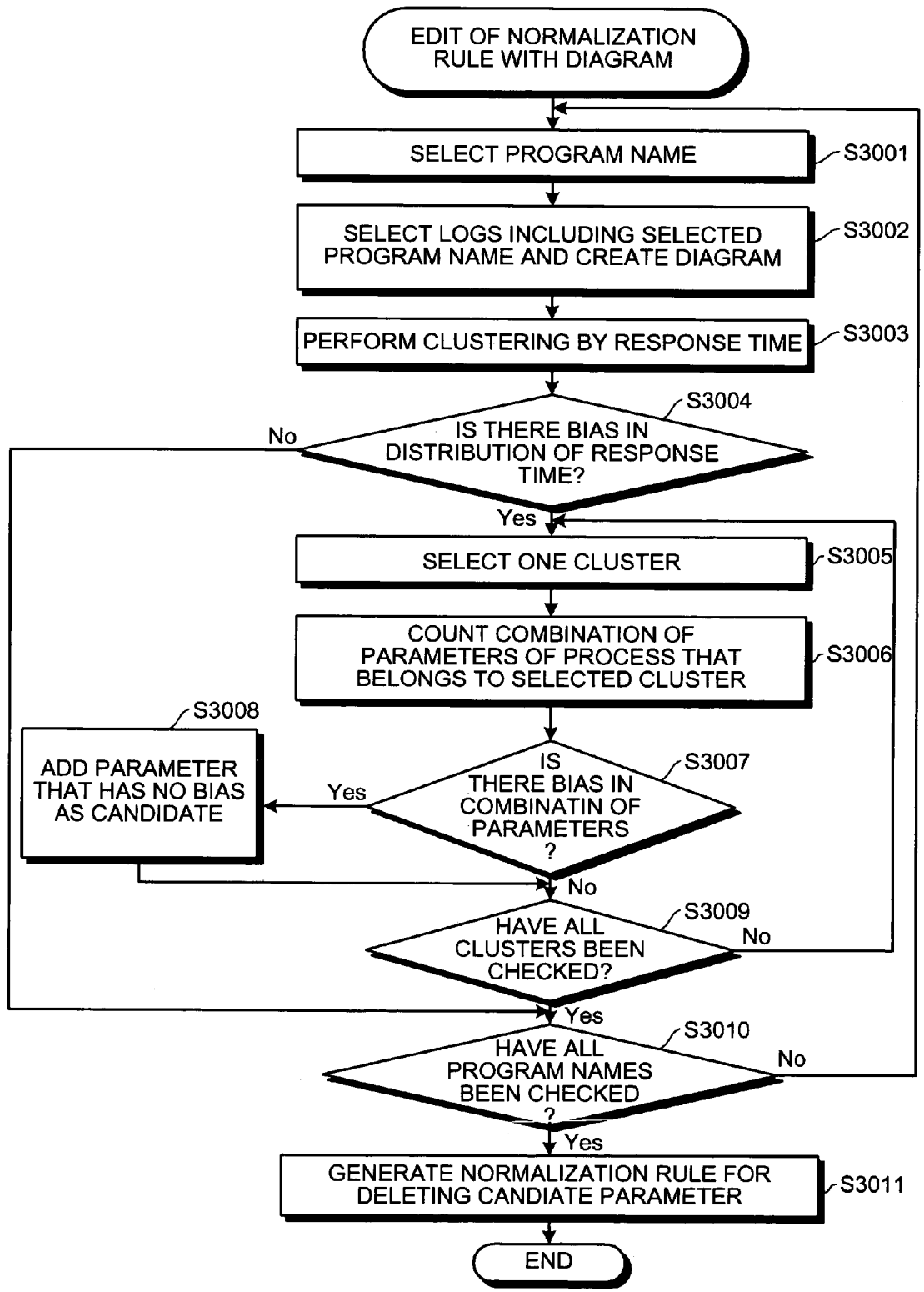
FIG. 9 is a flowchart of a normalization rule editing process performed by of the log-analysis-supporting system.

FIG. 9 is a flowchart of a normalization rule editing process performed by the normalization rule editor 7. The normalization rule editor 7 selects a program name (step S3001). For selecting the program name, the normalization rule editor 7 displays on a display (not shown in the diagram) a list of program names that are acquired from the parsing result storage 21, and the normalization rule editor 7 acquires a program name that is selected by the system manager from the list of program names displayed.

When the selection is over, the normalization rule editor 7 performs the diagram display of that program on the diagram display unit 62 (step S3002).

The diagram display is clustered in units of response time and displayed again (step S3003), and as a result of the clustering, a judgment of whether there is a bias in the distribution of response time is made (step S3004). If it is judged not to have a bias in the distribution of response time, the editing of this program name is terminated.

Whereas, at step S3004, if a judgment of a bias in the distribution of the response time is made, the normalization rule editor 7 extracts one cluster of the response time that is clustered at step S3003 (step S3005), and counts combinations of parameters of a process that belong to the cluster that is extracted (step S3006). For this, the normalization rule editor 7 performs this process by using the input data that is accumulated in the parsing result storage 21, and displays the result on the display. The system manager, having seen this result, checks if there is a bias in the combination of parameters, and if there is a bias, by using the input unit (not shown in the diagram), performs selection input of a presence or absence of the bias. As a result of this input, if the combination of parameters is judged to have a bias (step S3007), a process to store parameters that did not have a bias, as a candidate for data classification is performed (step S3008).

Moreover, if the combination of parameters is judged not to have a bias, or if the process at step S3008 is ended, the normalization rule editor 7 makes a judgment of whether all the clusters have been checked (step S3009). If all the clusters are judged not to have been checked, steps form step S3005 onward are repeated, and if all the clusters are judged to have been checked, the normalization rule editor 7 makes a judgment of whether it is checked for all the target program names (step S3010). At this point, if the check is not completed, the process returns to step S3001 and a series of steps mentioned above is repeated.

Whereas, if at step S3010, a judgment that editing of all the program names has been completed, is made, the normalization rule editor 7 generates automatically a rule for deleting parameters that have been stored every time at step S3008, and stores the rule additionally to the normalization rule storage 3 (step S3011).

Following is an explanation of another normalization rule editing process performed by the normalization rule editor 7 with the histogram. By referring to the histogram shown in FIG. 8, the system manager can determine whether there are processes that have similar distribution of response time but have a different combination of the parameter names and/or the parameter values. Such processes are desirable to be classified in one group.

As shown in FIG. 10, the similarity of the histograms is can be represented by the overlap area of two histograms A and B.

For example, let us assume that the similarity between a process corresponding the following URL (3) and other processes corresponding to any one of (1), (2), and (4) is low, whereas the similarities among processes corresponding (1), (2), (4) are high:

(1) http://hostname/dynamic.asp?PARAM=v1&PARAM2=v2&PARAM3=v3&PARAM4=v4;

(2) http://hostname/dynamic.asp?PARAM1=v1&PARAM3=v3&PARAM4=v4;

(3) http://hostname/dynamic.asp?PARAM1=v1&PARAM3=v3&PARAM5=v5; and (4) http://hostname/program.asp?PARAM1=v1&PARAM2=v2&PARAM4=v4.

A combination of PARAM 3 and PARAM 5 are included only in the process corresponding to (3). Therefore, the normalization rule is edited as follows to delete PARAM 1, PARAM 2 and PARAM 4 and to classify the URLs (1), (2) and (4) into one group.

program name: "dynamic.asp"
parameters: "PARAM1=.*"=>" ""PARAM2=.*=>" " "PARAM4=.*=>" "

Thus, for each program name, a normalization rule is generated to merge any two histograms with the highest similarity. By repeating the above process as long as the distribution decreases, it is possible to gather the combination of parameters that have histograms of high degree of similarity.

Figure 11:
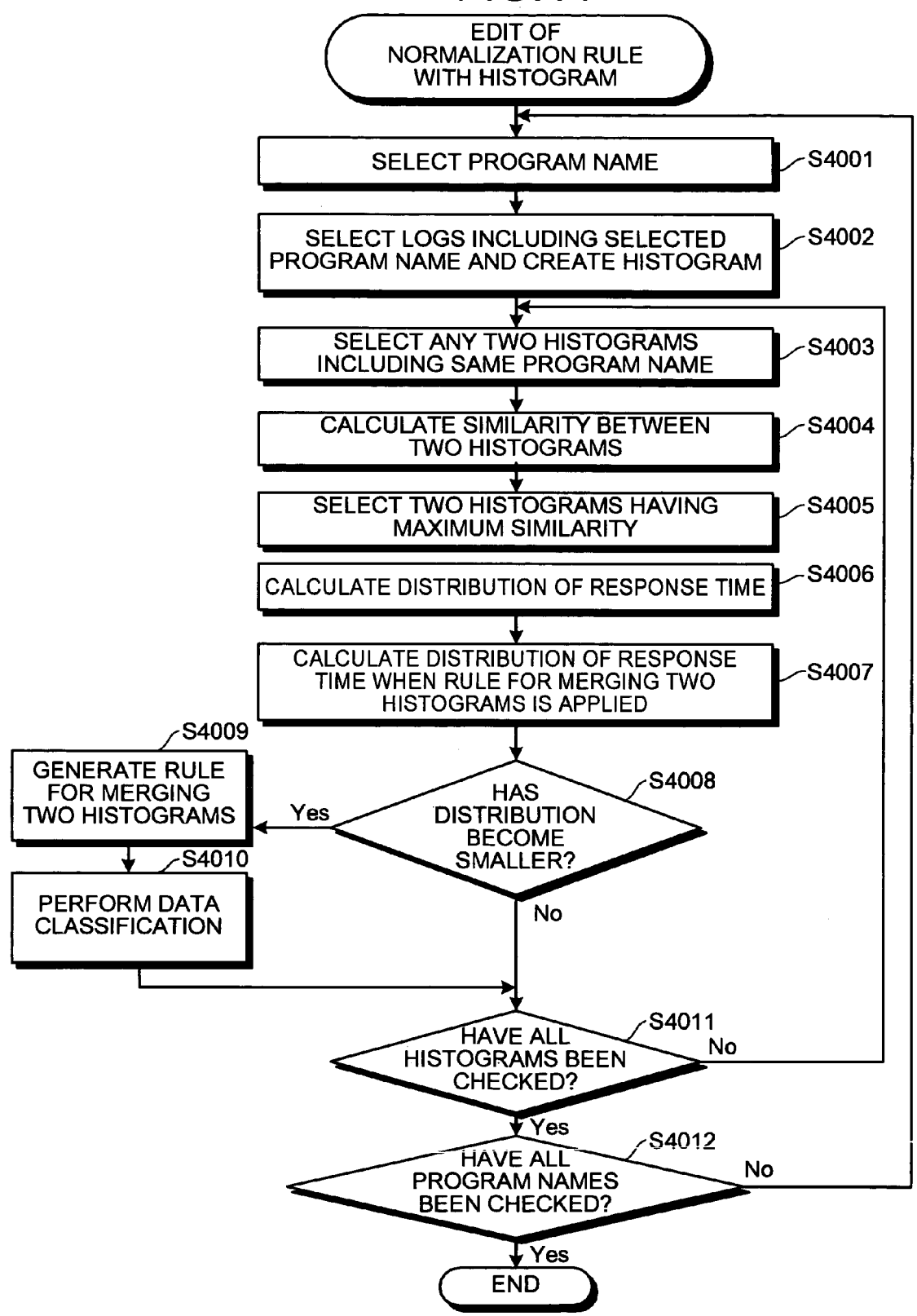
FIG. 11 is a flowchart of a normalization rule editing process performed by of the log-analysis-supporting system.

FIG. 11 is a flowchart of a normalization rule editing process performed by the normalization rule editor 7. The following is a description of the normalization rule editing process by the normalization rule editor by using the histogram display unit 63 according to the flowchart.

The normalization rule editor 7 selects a program name (step S4001). For selecting the program name, the normalization rule editor 7 displays on a display (not shown in the diagram) a list of program names that are acquired from the parsing result storage 21, and the normalization rule editor 7 acquires a program name that is selected by the system manager from the list of program names displayed.

When the selection is over, the normalization rule editor 7 performs the histogram display of that program on the histogram display unit 63 (step S4002). Subsequently, the normalization rule editor 7 selects two histograms that have the same program name (step S4003).

At this point, the normalization rule editor 7 calculates a degree of similarity of the two histograms. Concretely, the degree of similarity is calculated from a ratio of the overlapping area as described above (step S4004).

The normalization rule editor 7, in the current process, selects two histograms that have the highest degree of similarity (step S4005), and calculates the distribution of the response time (step S4006). Moreover, the normalization rule editor 7 calculates distribution of the response time when a rule that merges the two histograms selected is used (step S4007). The normalization rule editor 7 compares the distribution of the response time of the two target histograms and the response time of the two histograms that have the highest degree of similarity (step S4008). If the distribution of the response time of the two histograms selected is small, the normalization rule editor creates a rule that merges the two histograms (step S4009), and causes the data classifier 5 to perform the data classification process according to this rule (step S4010).

Then, the normalization rule editor makes a judgment of whether all histograms corresponding to target program names are checked or not (step S4011). If all the histograms are not checked, the process from step S4003 onward is repeated, if all the histograms are checked, the normalization rule editor 7 checks if the process is completed for all the program names (step S4012). If the process is not completed for all the program names, the process from the step S4001 onward is repeated, and if the process is completed for all the program names, it terminates the process.

The rules that have been edited by the normalization rule editor 7 are stored in the normalization rule storage 3 after the completion of the process.

When this series of process is over, a process in which the normalization rule output unit 8 stores the rules as the normalization rule file 9 that is stored in the normalization rule storage 3.

The normalization rule, as it has been mentioned earlier, is a set of regular expressions for replacing the program name, the parameter, and the parameter value upon verification with the input data. By outputting a normalization rule for which is the edit is over in a format that is readable in an external program, a filter program that performs the data classifier a previous process sub-program that can be used in a performance-analyzing system, is output.

FIG. 12 is an example of a normalization filter definition that is output to a file. FIG. 13 is an example in which the normalization filter definition that is output to the file is referred in an external analysis program.

Figure 14:
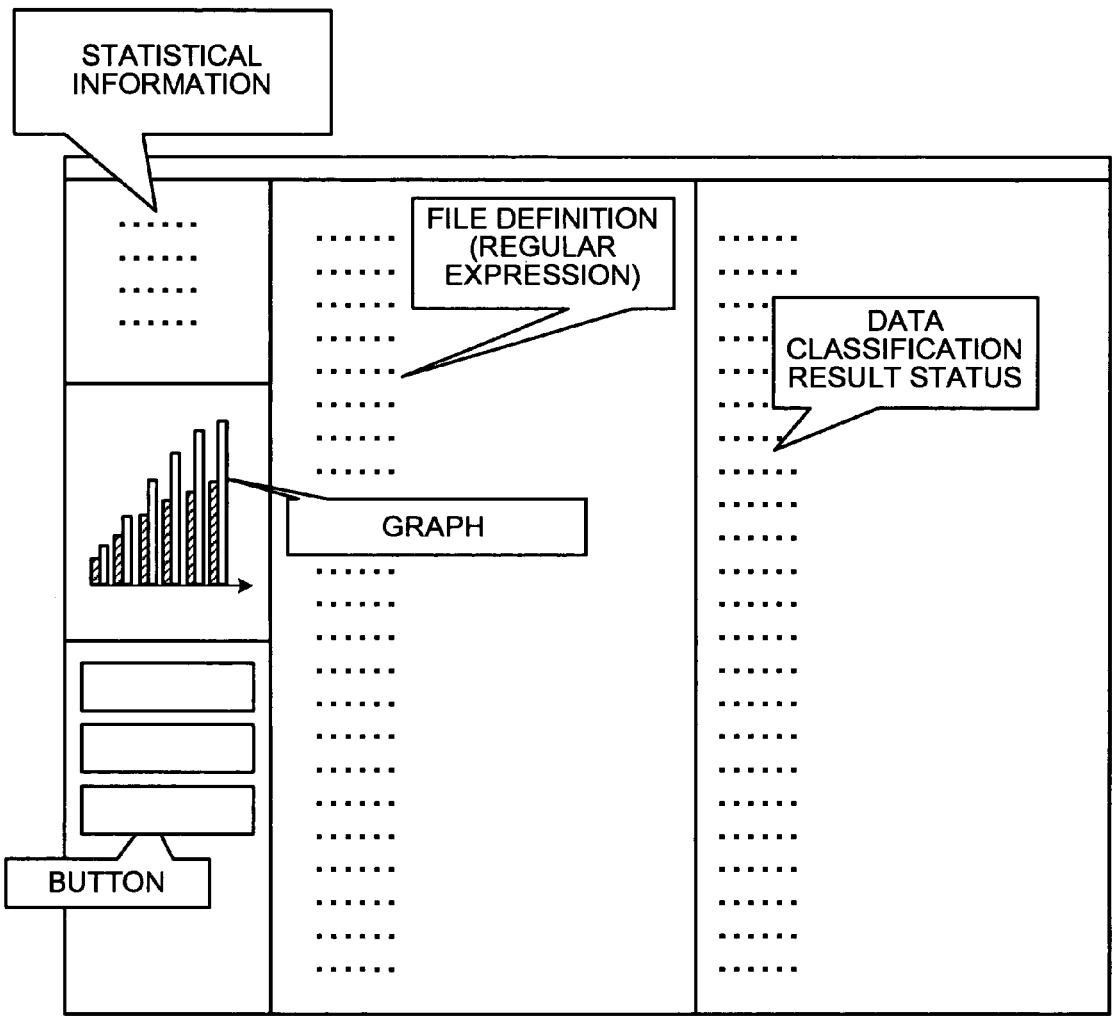
FIG. 14 is an example of a screen displayed by the log-analysis-supporting system.

The following is additional information about a screen interface according to the present embodiment. FIG. 14 is an example of a screen displayed by the log-analysis-supporting system according to the present invention.

As shown in FIG. 14, on a screen, apart from the graph, a filter definition that is generated automatically, a data classification result of input data by the filter that is defined, the number of input records, the number of types of URL that have appeared before and after the data classification, and operating buttons are disposed. Buttons such as one that designates a display of a diagram or a histogram, one for outputting a rule that is edited to a filter, are allocated as the operating buttons.

Thus, by displaying in parallel a display result of each of the units on one screen, it is a display of high visibility for the system manager.

Figure 15:
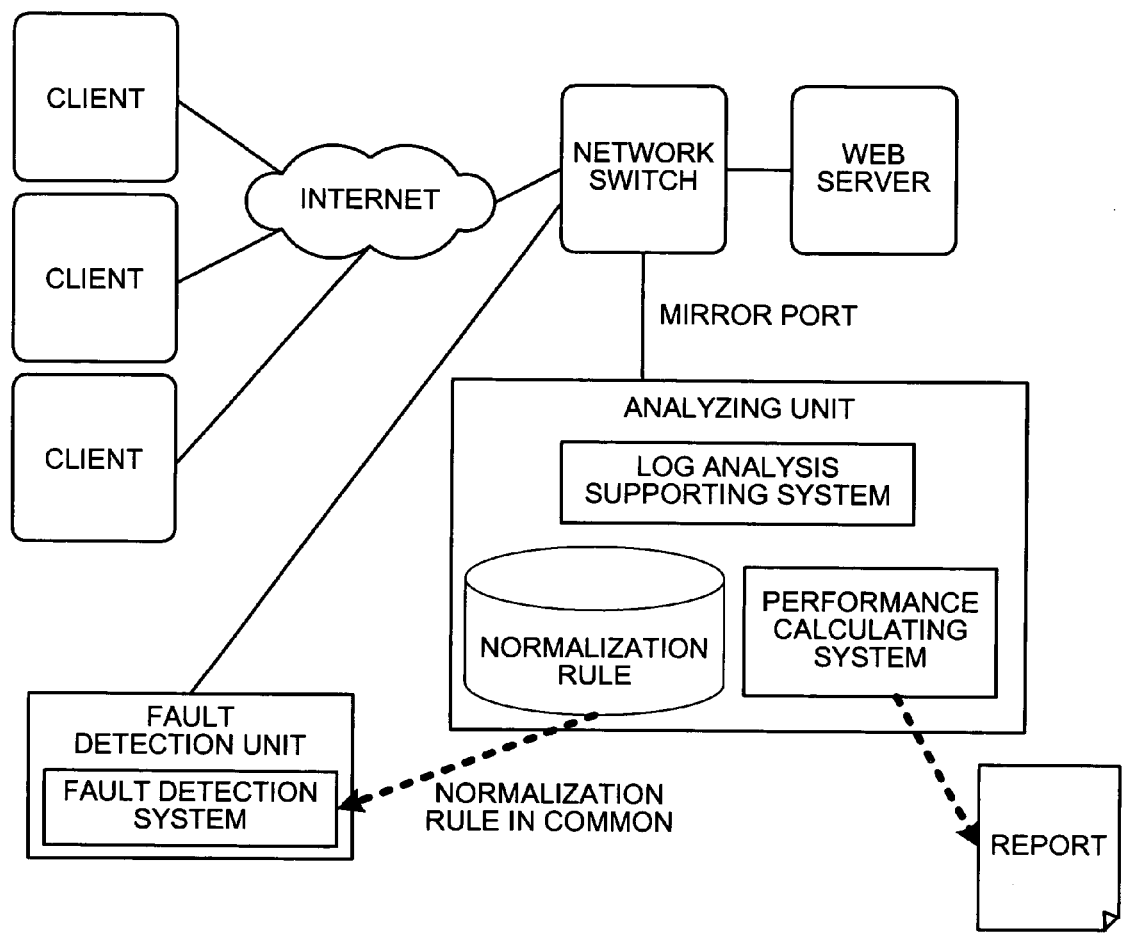
FIG. 15 is a diagram of a system including the log-analysis-supporting system.

FIG. 15 is a diagram of a transaction analyzing system including the log-analysis-supporting system according to the present invention. The transaction analyzing system monitors communication traffic among servers over a network, and analyzes a process time of an operation in a Web server based on calling.

A request for a process is made from a Web browser that is a client to a Web server via the Internet, and a result is returned. A network switch that connects the Internet and the server is disposed on a server side. A port called as a mirror port for observing the communication traffic from an analyzing unit is disposed in the network switch. By installing the log-analysis-supporting system according to the present embodiment in the analyzing unit that is connected to the mirror port, it is possible to tabulate a frequency of occurrence and a performance of a process and to output a report upon performing the data classification process by the normalization filter, which is a process prior to tabulating the input data. Moreover, the normalization rule that is generated by in the log-analysis-supporting system is output to a normalization rule filter. This normalization rule can be used commonly as a filter rule of a fault detection system of a fault detection unit that is connected to the mirror port independent from the analyzing unit. In the fault detection system, for the input data, it is possible to detect a fault in the system by comparing the frequency of occurrence and the performance of the process upon performing filtering by using the normalization rule, and to provide an operation such as delivering a warning.

According to the present invention, from an operation log file of a system, the system is let to generate automatically temporary initial rules. A result of data classification based on this definition is let to be provided to a system manager. Furthermore, the system manager is let to be able to edit the normalization rules that are generated automatically. Therefore, the data classification process can be simplified as compared to performing the data classification manually.

Moreover, on a system side, just by performing the data classification process by general temporary rules, an effective support of the data classification job by the system manager is achieved. Therefore, a job of developing a dedicated data classification program for each system can be omitted, thereby enabling to reduce work load on the system manager.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores a computer program for classifying a plurality of logs recorded in a log file, wherein the computer program causes a computer to execute:
    performing a parsing of the logs in the log file;
    generating a rule for a log classification based on a result of the parsing;
    performing the log classification, based on the rule generated, to classify the logs into a plurality of groups;
    displaying a result of the log classification;
    editing the rule based on an instruction from a user, wherein the rule generated includes deleting a first parameter that exists in each of a plurality of first logs, the first logs being included in the logs, and the first logs each including a same program name, replacing a value of a second parameter existing in each of the first logs with a predetermined character string when a number of values of the second parameter is more than a predetermined value, deleting a third parameter that exists in each of the first logs when a number of the first logs is less than a predetermined value, or replacing a variable part of a program name with a predetermined character string, a non-variable part of the program name existing in each of a plurality of second logs, when a number of the second logs is more than a predetermined value; and
    determining whether a distribution of a response time is biased due to a specific combination of a parameter name and a parameter value,
    wherein the editing includes editing, when determined that the distribution of the response time is biased due to the specific combination, the rule so that a parameter name and a parameter value other that those included in the specific combination are deleted from the logs.

2. The computer-readable recording medium according to claim 1, wherein the displaying includes displaying a graph that indicates a relationship between number of groups and a predetermined number of logs.

3. The computer-readable recording medium according to claim 1, wherein the displaying includes displaying a diagram that indicates a relationship between a response time and a combination of a parameter name and a parameter value that are included in the logs.

4. The computer-readable recording medium according to claim 1, wherein the displaying includes displaying a histogram that is created for each process corresponding to each of the groups and that indicates a relationship between a response time and number of logs.

5. The computer-readable recording medium according to claim 4, wherein the computer program further causes the computer to execute determining a first histogram that is most similar to a second histogram, the first histogram being created for a first process corresponding to a first group from among the groups, the second histogram being created for a second process corresponding to a second group from among the groups, wherein
    the editing includes editing the rule so that the first histogram and the second histogram are merged.

6. An apparatus for classifying a plurality of logs recorded in a log file, the log-analysis-supporting apparatus comprising:
    a parsing unit that performs a parsing of the logs in the log file;
    a rule generating unit that generates a rule for a log classification based on a result of the parsing;
    a log classifying unit that performs the log classification, based on the rule generated, to classify the logs into a plurality of groups;
    a display unit that displays a result of the log classification;
    a rule editing unit that edits the rules based on an instruction from a user, wherein the rule generated by the rule generating unit includes deleting a first parameter that exists in each of a plurality of first logs, the first logs being included in the logs, and the first logs each including a same program name, replacing a value of a second parameter existing in each of the first logs with a predetermined character string when a number of values of the second parameter is more than a predetermined value, deleting a third parameter that exists in each of the first logs when a number of the first logs is less than a predetermined value, or replacing a variable part of a program name with a predetermined character string, a non-variable part of the program name existing in each of a plurality of second logs, when a number of the second logs is more than a predetermined value; and
    a determining unit that determines whether a distribution of a response time is biased due to a specific combination of a parameter name and a parameter value,
    wherein the editing includes editing, when determined that the distribution of the response time is biased due to the specific combination, the rule so that a parameter name and a parameter value other that those included in the specific combination are deleted from the logs.

7. The apparatus according to claim 6, wherein the display unit displays a graph that indicates a relationship between number of groups and a predetermined number of logs.

8. The apparatus according to claim 6, wherein the display unit displays a diagram that indicates a relationship between a response time and a combination of a parameter name and a parameter value that are included in the logs.

9. The apparatus according to claim 6, wherein the display unit displays a histogram that is created for each process corresponding to each of the groups and that indicates a relationship between a response time and number of logs.

10. The apparatus according to claim 9, further comprising a determining unit that determines a first histogram that is most similar to a second histogram, the first histogram being created for a first process corresponding to a first group from among the groups, the second histogram being created for a second process corresponding to a second group from among the groups, wherein the editing unit edits the rule so that the first histogram and the second histogram are merged.

11. A method performed by a log-analysis-supporting system for classifying a plurality of logs recorded in a log file, the method comprising:

performing a parsing of the logs in the log file;

generating a rule for a log classification based on a result of the parsing;

performing the log classification, based on the rule generated, to classify the logs into a plurality of groups;

displaying a result of the log classification;

editing the rule based on an instruction from a user, wherein the rule generated includes deleting a first parameter that exists in each of a plurality of first logs, the first logs being included in the logs, and the first logs each including a same program name, replacing a value of a second parameter existing in each of the first logs with a predetermined character string when a number of values of the second parameter is more than a predetermined value, deleting a third parameter that exists in each of the first logs when a number of the first logs is less than a predetermined value, or replacing a variable part of a program name with a predetermined character string, a non-variable part of the program name existing in each of a plurality of second logs, when a number of the second logs is more than a predetermined value; and determining whether a distribution of a response time is biased due to a specific combination of a parameter name and a parameter value, wherein the editing includes editing, when determined that the distribution of the response time is biased due to the specific combination, the rule so that a parameter name and a parameter value other that those included in the specific combination are deleted from the logs.

12. The method according to claim 11, wherein the displaying includes displaying a graph that indicates a relationship between number of groups and a predetermined number of logs.

13. The method according to claim 11, wherein the displaying includes displaying a diagram that indicates a relationship between a response time and a combination of a parameter name and a parameter value that are included in the logs.

14. The method according to claim 11, wherein the displaying includes displaying a histogram that is created for each process corresponding to each of the groups and that indicates a relationship between a response time and number of logs.

15. The method according to claim 14, further comprising determining a first histogram that is most similar to a second histogram, the first histogram being created for a first process corresponding to a first group from among the groups, the second histogram being created for a second process corresponding to a second group from among the groups, wherein the editing includes editing the rule so that the first histogram and the second histogram are merged.

* * * * *